US012412683B2

(12) United States Patent
Nilsson et al.

(10) Patent No.: US 12,412,683 B2
(45) Date of Patent: Sep. 9, 2025

(54) BUSHING ASSEMBLY FOR A HOUSING FOR ELECTRICAL

(71) Applicant: Hitachi Energy Ltd, Zürich (CH)

(72) Inventors: Erik Nilsson, Ludvika (SE); Johan Nordlof, Borlänge (SE)

(73) Assignee: Hitachi Energy Ltd, Zürich (CH)

( * ) Notice: Subject to any disclaimer, the term of this patent is extended or adjusted under 35 U.S.C. 154(b) by 144 days.

(21) Appl. No.: 18/113,720

(22) Filed: Feb. 24, 2023

(65) Prior Publication Data

US 2023/0317322 A1 Oct. 5, 2023

(30) Foreign Application Priority Data

Mar. 31, 2022 (EP) .................................... 22166154

(51) Int. Cl.
*H01B 17/58* (2006.01)

(52) U.S. Cl.
CPC .................................. *H01B 17/583* (2013.01)

(58) Field of Classification Search
CPC .............................. H01B 17/58; H01B 17/583
USPC ......................................................... 174/668
See application file for complete search history.

(56) References Cited

U.S. PATENT DOCUMENTS

| | | | |
|---|---|---|---|
| 4,767,351 | A | 8/1988 | Patel et al. |
| 4,956,525 | A | 9/1990 | Wilk |
| 2016/0044813 | A1 | 2/2016 | Schorner et al. |

FOREIGN PATENT DOCUMENTS

| | | | |
|---|---|---|---|
| EP | 3618084 | B1 | 9/2021 |
| JP | S57201719 | U | 12/1982 |
| KR | 20220006873 | A | 1/2022 |

OTHER PUBLICATIONS

Extended European Search Report, European Patent Application No. 22166154.9, mailed Oct. 5, 2022, 9 pages.
Office Action, Indian Patent Application No. 202344014323, mailed Dec. 12, 2024, 6 pages.

*Primary Examiner* — Tremesha W Burns
(74) *Attorney, Agent, or Firm* — Sage Patent Group

(57) ABSTRACT

A bushing assembly for mounting in openings of a panel of a housing for electrical equipment, such as a capacitor housing. The bushing assembly includes a plurality of first bushing members releasably attachable through a respective one of said openings of the panel to a single second bushing member positioned on an inside of the panel inside the housing.

16 Claims, 3 Drawing Sheets

BUSHING ASSEMBLY FOR A HOUSING FOR ELECTRICAL

CROSS REFERENCE TO RELATED APPLICATIONS

This application claims foreign priority to European Patent Application No. 22166154.9, filed on Mar. 31, 2022, the disclosure and content of which is incorporated by reference herein in their entirety.

TECHNICAL FIELD

The present disclosure relates to assembly of bushings to a housing for electrical equipment. The electrical equipment may be capacitors.

BACKGROUND

Capacitor units comprise a capacitor housing containing the capacitor(s). Electrical connection to the capacitor(s) is provided through openings in the capacitor housing and the openings are provided with bushings which align electrical connectors and provide electrical insulation between the electrical connectors and the housing. During assembly of the capacitor unit, the capacitor(s) is fitted in the capacitor housing and bushings mounted in the openings of the capacitor housing. Electrical conductors are mounted between the bushings and the electrical connectors/terminals in the bushings to enable external electrical connections to the capacitors through the housing. Once everything is fitted, the capacitor housing is sealed, for example by welding a lid of the capacitor housing to the rest of the capacitor housing. Subsequently, a substance may be introduced into the capacitor housing to secure the components and provide insulation between them. Prior art bushings comprise an outer bushing member which is introduced into an opening of the capacitor housing and subsequently secured on place by screwing an inner bushing member in form of a nut onto a corresponding threaded portion of an outer bushing member protruding into the capacitor housing through an opening in the housing. Typically, the openings of the capacitor unit are provided on a lid of the capacitor housing. Once the lid is welded onto the rest of the capacitor housing, the nut inside the capacitor housing cannot be reached, which means that the outer bushing member cannot be replaced. Hence, any damages to the outer bushing members after the lid has been welded to the rest of the capacitor housing cannot be remedied and the capacitor unit has to be replaced in full by a new capacitor unit.

SUMMARY

Accordingly, an object of the present disclosure is to provide for easy replacement of a damaged part of a bushing after the capacitor unit has been sealed closed.

According to a first aspect of the present disclosure, this and other objects are achieved by a bushing assembly according to independent claim 1 with alternative embodiments defined in its dependent claims. The bushing assembly is suitable for mounting in openings of a panel of a housing for electrical equipment, such as a housing of a capacitor. The bushing assembly comprises a plurality of first bushing members, wherein each first bushing member is configured to be seated in a respective one of said openings of the panel with a central portion of the first bushing member extending along a longitudinal axis of the first bushing member through the respective opening from a first side of the panel to a second side of the panel. One or more protrusions of the first bushing member extends radially away from the central portion with respect to the longitudinal axis for preventing the first bushing member to move through the respective opening. The protrusions may have any suitable shape, such as a circumferential flange, ridge, or shoulder.

The bushing assembly further comprises a second bushing member to which the first bushing members are releasably attachable with the one or more protrusions of the first bushing members positioned on the first side of the panel and with the second bushing member positioned on the second side of the panel.

A housing for electrical equipment is typically formed by a plurality of panels together defining an inner volume of the housing. Such a panel may thus be any wall, or portion of a wall, of the housing, or a lid attachable to the rest of the housing. Electrical connections are often made through openings in a panel of the housing with bushings seated in each opening for securing and aligning electrical connectors or cables relatively the housing. The bushing assembly is attached to the housing during assembly of a device comprising the electrical housing, for example a capacitor.

The bushing assembly according to the present disclosure is mounted to the panel of the housing by first positioning the second bushing member on the second side of the panel, preferably using a dedicated jig for easier handling and alignment. A plurality of the first bushing members are subsequently attached to the second bushing member with each first bushing member inserted in a respective one of said openings of the panel with a central portion of each respective first bushing member extending through the respective opening of the panel from the first side of the panel to the second side of the panel. The first bushing members are then releasably attached to the second bushing member through said openings of the panel. When only one first bushing member is attached to the second bushing member the second bushing member would be free to move if the first bushing member would be detached from the second bushing member, but since a plurality of first bushing members are attached to the second bushing member, the second bushing member is secured. Once the second bushing member is secured by a plurality of first bushing members, one of the first bushing members can be released from the second bushing member for inspection or replacement of the first bushing member released without access to the second bushing member. This is useful when you cannot reach the second bushing member, such as when the bushing assembly is mounted on a panel of a closed housing or on a panel having a size, position and/or shape such that you cannot reach second bushing member and manually hold it secured during replacement of a first bushing member.

Each first bushing member may comprise a first connection means, wherein the second bushing member comprises a plurality of corresponding second connection means. Each first connection means is releasably attachable to a respective one of the second connection means.

The first connection means and the second connection means may be configured such that each first connection means is releasably attachable to the second connection means by rotational relative movement between the respective first bushing member and the second bushing member about the respective longitudinal axis of the respective first bushing member.

Each second connection means may comprise a threaded opening, wherein each first connection means comprises corresponding threads provided on the central portion of the respective first bushing member.

The first connection means and the second connection means may be configured to engage each other on the second side of the panel.

By configuring the first and second connection means such that they engage on the second side of the panel, no portion of the second bushing member needs to protrude through the opening of the panel, which in turn means that no portion of the second bushing member needs to protrude outside the housing. Any part protruding outside the housing stands a higher risk of mechanical damage and since the first bushing member often cannot be replaced without disassembly of the housing, it is advantageous to protect the second bushing member from damage by designing it such that is does not protrude outside the housing when in use.

A second aspect of the above-mentioned object is also achieved by a housing assembly comprising a housing for housing electrical equipment inside the housing, and a bushing assembly such as the above-described bushing assembly. The housing comprises a panel, and the panel comprises a first side facing outside the housing, an opposite second side facing inside the housing, and a plurality of openings between the first side and the second side of the panel. The bushing assembly comprises: a plurality of first bushing members, wherein each first bushing member is seated in a respective one of said openings of the panel with a central portion of the first bushing member extending along a longitudinal axis of the first bushing member through the respective opening of the panel from the first side of the panel to the second side of the panel, and with one or more protrusions of the first bushing member extending radially away from the central portion with respect to the longitudinal axis for preventing the first bushing member to move through the respective opening to the second side of the panel. The bushing assembly further comprises a second bushing member to which the first bushing members are releasably attached with the one or more protrusions of the first bushing member positioned on the first side of the panel and with the second bushing member positioned on the second side of the panel.

The housing assembly may further comprise one or more capacitors provided inside the housing and with the housing sealed closed such that it cannot be opened. For example, the panel may be a lid of the housing that has been non-removably attached to the housing to close and seal the housing, for example by gluing or welding.

A third aspect of the above-mentioned object is also achieved by a method of assembling a housing assembly. The housing assembly comprises a housing for housing electrical equipment inside the housing and a bushing assembly, such as one of the above-described bushing assemblies. The housing comprises a housing body and a panel attachable to an opening of the housing body such that the panel covers the opening of the housing body. The panel comprises a first side facing outside the housing, an opposite second side facing inside the housing, and a plurality of openings between the first side and the second side of the panel. The bushing assembly comprises a plurality of first bushing members. Each first bushing member is configured to be seated in a respective one of said openings of the panel with a central portion of the first bushing member extending along a longitudinal axis of the first bushing member through the respective opening of the panel, from the first side of the panel to the second side of the panel. One or more protrusions of the first bushing members extend radially away from the central portion of the first bushing member with respect to the longitudinal axis for preventing the first bushing member to move through the respective opening of the panel.

The bushing assembly further comprises a second bushing member to which the first bushing members are releasably attachable with the one or more protrusions of the first bushing member positioned on the first side of the panel and with the second bushing member positioned on the second side of the panel. The method comprises positioning the second bushing member on the second side of the panel, attaching the plurality of first bushing members to the second bushing member through the openings of the panel such that each first bushing member is seated in a respective one of the openings of the panel. Once the bushing assembly is mounted on the panel, the panel is non-removably attached to the housing body such that the panel covers the opening of the housing body.

As the housing is handled during assembly, there is a risk of damaging the first bushing members, for example during welding or gluing of the panel to the housing body. With prior art bushing designs a nut on the inside of the housing would need to be rotated to disengage the outer bushing member (first bushing member) for replacement, but that may be impossible once the lid is non-removably attached to the housing since the nut cannot be accessed. By first attaching a plurality of first bushing members to the second bushing member, the second bushing member is secured in place by the plurality of first bushing members such that one of the first bushing members can be replaced without access to the first second bushing member and without losing the second bushing member into the housing. This method may improve success rate at assembly of the housing assembly since the product comprising the housing assembly does not have to be discarded merely because a first bushing member is damaged at assembly.

The method may further comprise mounting one or more capacitors inside the housing, mounting electrical connectors in the first bushing members and/or in the second bushing members, and mounting electrical conductors from the capacitor(s) to the electrical connectors before the panel is non-removably attached to the housing body.

BRIEF DESCRIPTION OF THE DRAWINGS

FIG. 1 shows a prior art outer bushing member to be inserted into an opening of a panel of the housing from the outside of the housing.

FIG. 2 shows a portion of the prior art panel of the housing.

FIG. 3 shows a cross-sectional side view of a prior art bushing assembly comprising the outer bushing member also shown in FIG. 1, and an inner bushing member in the form of a nut attaching the outer bushing member to the panel. Also, electrical connectors are shown in broken lines.

DETAILED DESCRIPTION

Embodiments of a bushing assembly according to the present disclosure will hereinafter be described with reference to the appended drawings.

Figure 8:
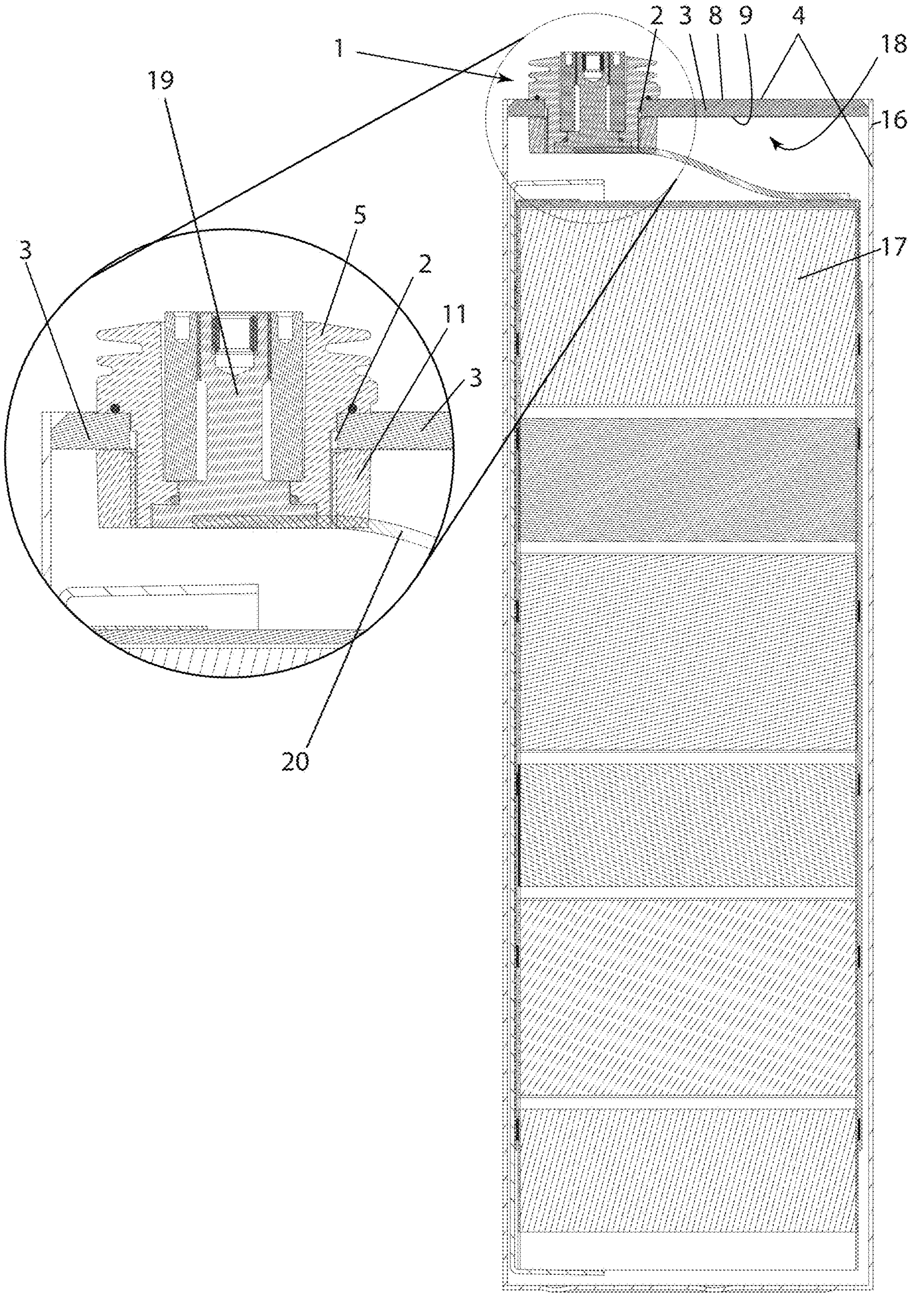
FIG. 8 shows a cross-sectional side view of a capacitor unit comprising a bushing assembly according to the embodiment also shown in FIGS. 5 and 6.

As shown in FIG. 8, the bushing assembly 1 may be provided as part of a housing assembly for a capacitor unit, said housing assembly comprising the bushing assembly 1, and a housing 4. Electrical terminals/connectors 19 are fitted to the housing 4 of the housing assembly using the bushing assembly 1. Also, electrical conductors 20 connect the electrical terminals 19 to one or more capacitor(s) 17 inside the housing 4. The housing 4 comprises a panel 3 used a lid to seal an opening 18 of a housing body 16 of the housing 4. The panel 3 is non-removably attached to the housing body by welding, although any other suitable way of non-removably attaching the panel 3 could be used instead, such as gluing. It should be understood that the FIG. 8 view shows the bushing assembly 1 from a perspective in which only one of its two first bushing members/outer bushing members 5 is visible. However, the depicted bushing assembly is the same as the one shown in FIGS. 5 and 6.

Figure 5:
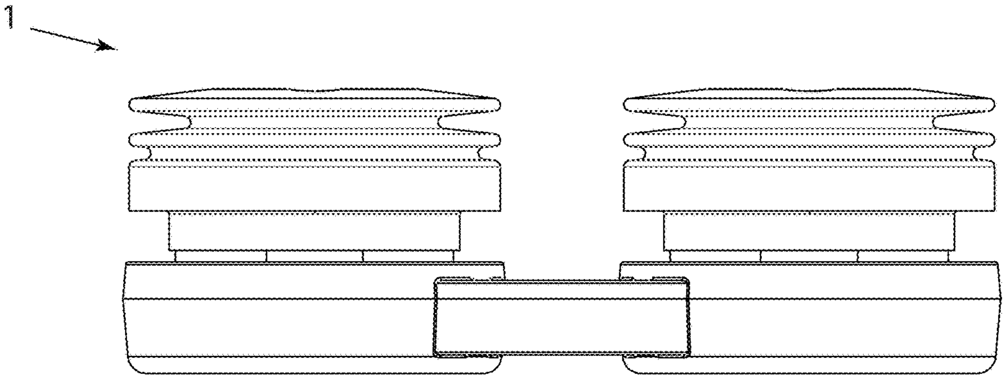
FIG. 5 shows a side view of the bushing assembly also shown in FIG. 4.
Figure 6:
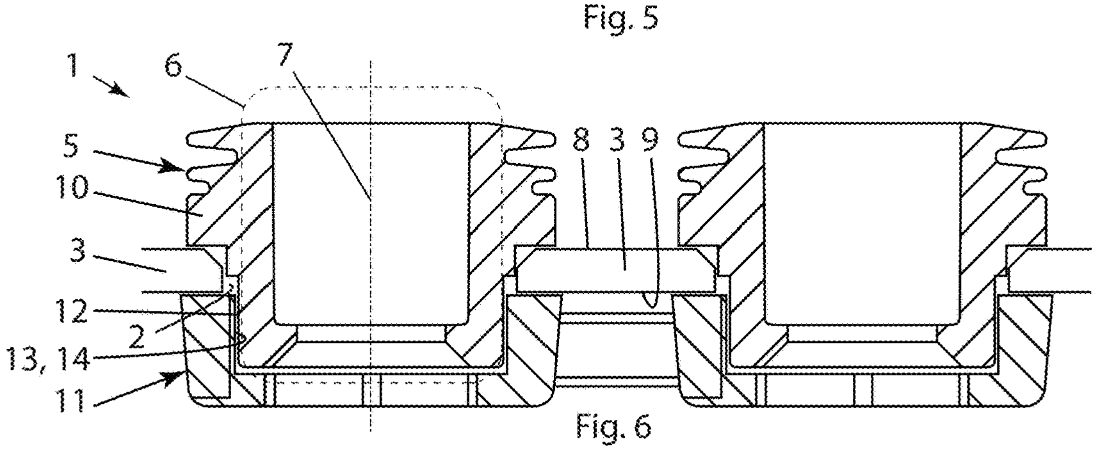
FIG. 6 shows a cross-sectional side view of the bushing assembly also shown in FIGS. 4 and 5.

As shown in FIGS. 5, 6 and 8, the bushing assembly 1 comprises a plurality of first bushing members 5, wherein each first bushing member 5 is configured to be seated in a respective one of said openings 2 of the panel with a central portion 6 of the first bushing member 5 extending along a longitudinal axis 7 of the first bushing member 5 through the respective opening 2 or the panel 3, from a first side of the panel 3, facing the outside of the housing, to a second side of the panel 3, facing the inside of the housing 4. A protrusion 10 of the first bushing member 5 extends radially away from the central portion 6 with respect to the longitudinal axis 7 for preventing the first bushing member 5 to move through the respective opening 2. The protrusion 10 allows the first bushing member 5 to be tightened to the panel 3. In this embodiment, the protrusion 10 is a circumferential ridge or shoulder, but any other suitable protrusion could alternatively be used instead to prevent the first bushing member 5 from moving through the opening 2.

As show in FIG. 8, an O-ring may be provided to seal between the circumferential ridge/shoulder 10 and the panel 3.

The bushing assembly 1 further comprises a second bushing member 11 to which the first bushing members 5 are releasably attachable. When attached, the one or more protrusions 10 of the first bushing members 5 is positioned on the first side 8 of the panel and the second bushing member 11 is positioned on the second side 9 of the panel.

Each first bushing member comprise a first connection means, and the second bushing member comprises a plurality of corresponding second connection means. Each first connection means is releasably attachable to a respective one of the second connection means.

In some embodiments, the first 12 and second 13 connection means are provided with corresponding threads, such that the first bushing members 5 can be releasably attached to the second bushing member by rotational relative movement between the respective first bushing member and the second bushing member about the respective longitudinal axis of the respective first bushing member. However, any other suitable type of connection means could alternatively be provided instead, such as a twist-lock mechanism or a snap-lock mechanism which could either be connected by a linear relative movement of the first bushing member 5 into the second bushing member, or by a rotational relative movement in any direction. Further, the connection means could comprise one or more additional movable members which are operated to lock and unlock the engagement between the first bushing member and the second bushing member.

Figure 7:
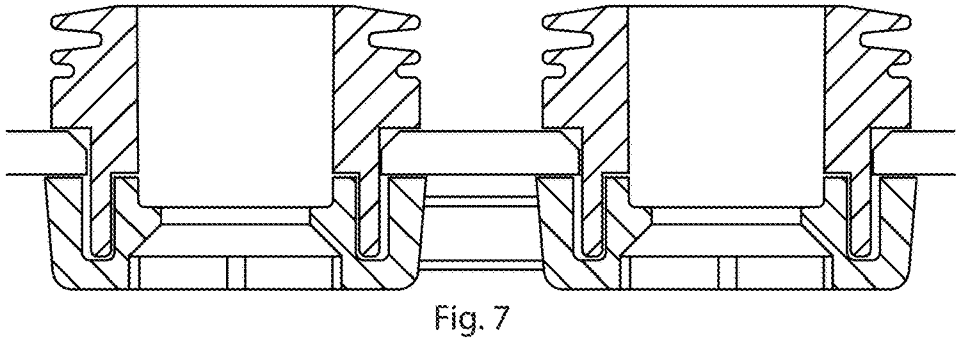
FIG. 7 shows a cross-sectional side view of a bushing assembly according to a second embodiment of the present disclosure.

An alternative embodiment of the threaded connection means is shown in FIG. 7.

Connection means based on twist-lock or relative rotational movement are advantageous in that momentum applied to the second bushing member by the first bushing member to be connected/released is taken up by the engagement between the second bushing member and the plurality of first bushing members attached to the second bushing member.

Figure 1:
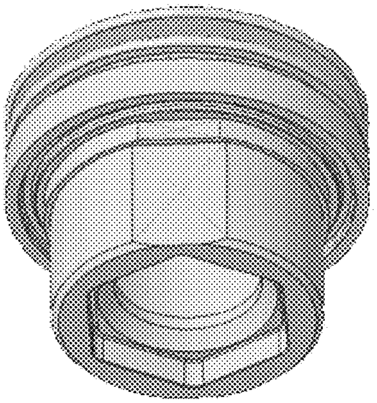
Fig. 1 Prior art
FIGS. 1-3 show a prior art bushing for a housing for electrical equipment and a portion of a panel of the housing.
Figure 2:
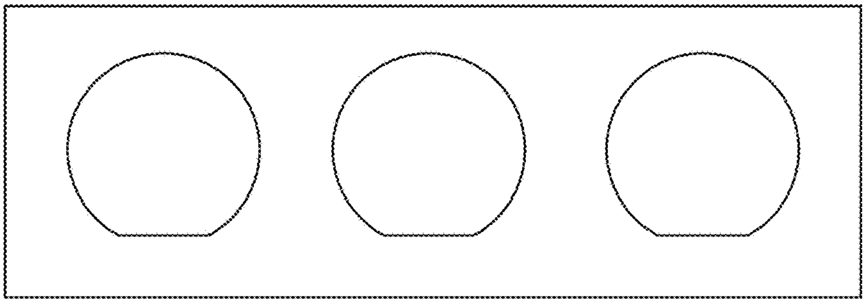
Fig. 2 Prior art
Figure 3:
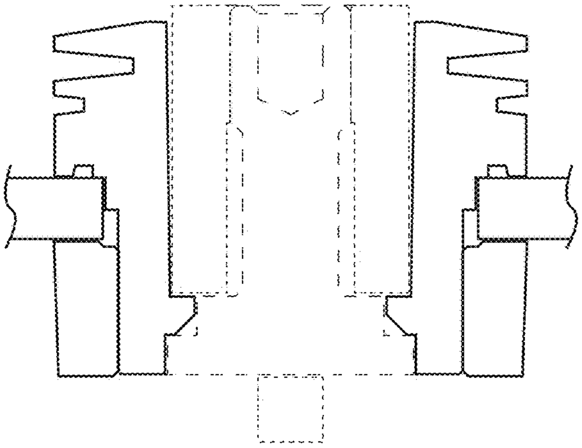
Fig. 3 Prior art
Figure 4:
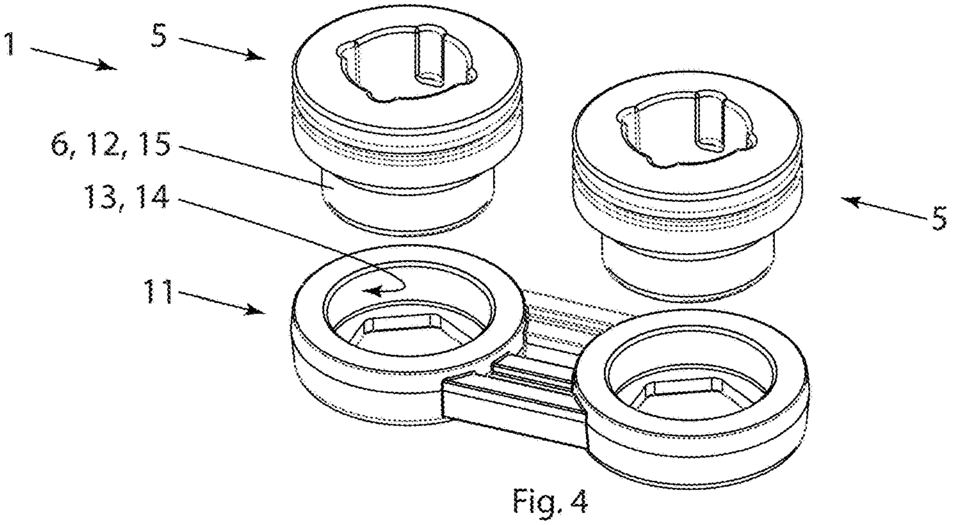
FIG. 4, shows an exploded perspective view of a bushing assembly according to a first embodiment of the present disclosure.

Also, in contrast to the prior art panel shown in FIG. 2, the panel 3 of the present embodiment is provided with round openings 2, i.e., openings that are shaped to allow rotation of the first bushing member 5.

As shown in FIG. 6, the first 12 and second 13 connection means engage each other on the second side 9 of the panel and no portion of the second connection means 11 protrudes through the openings 2 of the panel 3. Hence, the risk of damage to the second bushing member 11 by foreign objects on the first side of the panel 3 is low.

It is advantageous to protect the second bushing member 11 from damage since it cannot readily be replaced once the panel 3 has been attached to a sealed housing 4 with the second bushing member 11 positioned inside the sealed housing 4.

As can be understood from the discussion above, this type of bushing assembly 1 is particularly advantageous when used with enclosed housings, since it allows for replacement of first bushing members/outer bushing members 5 after the housing 4 has been sealed closed, such as by non-removable attachment of a panel with the bushings. The bushing assembly 1 could be provided on any portion of the housing 4 and not necessarily on a lid panel 3 attached to the housing 4.

Accordingly, a method of assembling a housing assembly is also described here. The housing assembly comprises a housing 4 for housing electrical equipment inside the housing and a bushing assembly 1, in the present example, a bushing assembly 1 according to the first embodiment, although any other bushing assembly within the scope of the claims could alternatively be used instead.

The method comprises positioning the second bushing member 11 on the second side of the panel, i.e., the side of the panel facing the inside of the housing 4, and attaching the plurality of first bushing members 5 to the second bushing member 11 through the openings 2 of the panel 3 such that each first bushing member 5 is seated in a respective one of the openings 2 of the panel 3. Once the bushing assembly 1 has been mounted on the panel 3, the panel 3 is non-removably attached to the housing body 16 such that the panel 3 covers the opening 18 of the housing body 4. In some other embodiments, the bushing assembly 1 could instead be attached to a panel of the housing body 16, wherein the housing 4 is subsequently sealed closed by non-removably attaching the lid panel 3 to the housing body 16.

| | |
|---|---|
| 1 | bushing assembly |
| 2 | opening of a housing for electrical equipment |
| 3 | panel of housing |
| 4 | housing for electrical equipment |
| 5 | first bushing member |
| 6 | central portion of first bushing member |
| 7 | longitudinal axis of first bushing member |
| 8 | first side of panel |
| 9 | second side of panel |
| 10 | protrusion extending radially away from longitudinal axis |
| 11 | second bushing member |
| 12 | first connection means |
| 13 | second connection means |
| 14 | threaded opening |
| 15 | threads on central portion |
| 16 | housing body |
| 17 | Capacitor |
| 18 | opening of housing body |
| 19 | electrical connector/terminal |
| 20 | Conductor |

The invention claimed is:

1. A bushing assembly for mounting in openings of a panel of a housing for electrical equipment, said bushing assembly comprising: a plurality of first bushing members, wherein each first bushing member is configured to be seated in a respective one of said openings with a central portion of the first bushing member extending along a longitudinal axis of the first bushing member through the respective opening from a first side of the panel to a second side of the panel, and with one or more protrusions of the first bushing member extending radially away from the central portion with respect to the longitudinal axis for preventing the first bushing member to move through the respective opening, wherein the bushing assembly further comprises a second bushing member to which the first bushing members are releasably attachable, with the one or more protrusions of the first bushing members positioned on the first side of the panel and with the second bushing member positioned on the second side of the panel.

2. The bushing assembly according to claim 1, wherein each first bushing member comprises a first connection means and wherein second bushing member comprises a plurality of corresponding second connection means, wherein each first connection means is releasably attachable to a respective one of the second connection means.

3. The bushing assembly according to claim 2, wherein the first connection means and the second connection means are configured such that each first connection means is releasably attachable to the second connection means by rotational relative movement between the respective first bushing member and the second bushing member about the respective longitudinal axis of the respective first bushing member.

4. The bushing assembly according to claim 3, wherein each second connection means comprises a threaded opening, and wherein each first connection means comprises corresponding threads provided on the central portion of the respective first bushing member.

5. The bushing assembly according to claim 1, wherein the one or more protrusions of the first bushing member comprises a circumferential flange, ridge, or shoulder.

6. The bushing assembly according to claim 1, wherein first connection means and second connection means are configured to engage each other on the second side of the panel.

7. A housing assembly comprising a housing for housing electrical equipment inside the housing, and a bushing assembly, wherein the housing comprises a panel, wherein the panel comprises a first side facing outside the housing, an opposite second side facing inside the housing, and a plurality of openings between the first side and the second side of the panel, and wherein the bushing assembly comprises:

a plurality of first bushing members, wherein each first bushing member is seated in a respective one of said openings of the panel with a central portion of the first bushing member extending along a longitudinal axis of the first bushing member through the respective opening of the panel from the first side of the panel to the second side of the panel, and with one or more protrusions of the first bushing member extending radially away from the central portion with respect to the longitudinal axis for preventing the first bushing member to move through the respective opening to the second side of the panel, wherein the bushing assembly further comprises a second bushing member to which the first bushing members are releasably attached, with the one or more protrusions of the first bushing member positioned on the first side of the panel and with the second bushing member positioned on the second side of the panel.

8. A housing assembly according to claim 7, further comprising one or more capacitors provided inside the housing, wherein the housing is sealed closed such that it cannot be opened.

9. A method of assembling a housing assembly, said housing assembly comprising a housing for housing electrical equipment inside the housing and a bushing assembly, wherein the housing comprises a housing body and a panel attachable to an opening of the housing body such that the panel covers the opening of the housing body, wherein the panel comprises a first side facing outside the housing, an opposite second side facing inside the housing, and a plurality of openings between the first side and the second side of the panel, wherein the bushing assembly comprises:

a plurality of first bushing members, wherein each first bushing member is configured to be seated in a respective one of said openings of the panel with a central portion of the first bushing member extending along a longitudinal axis of the first bushing member through the respective opening of the panel, from the first side of the panel to the second side of the panel, and with one or more protrusions extending radially away from the central portion with respect to the longitudinal axis for preventing the first bushing member to move through the respective opening of the panel, wherein the bushing assembly further comprises a second bushing member to which the first bushing members are releasably attachable, with the one or more protrusions of the first bushing member positioned on the first side of the panel and with the second bushing member positioned on the second side of the panel, wherein the method comprises: positioning the second bushing member on the second side of the panel, attaching the plurality of first bushing member to the second bushing member through the openings of the panel such that each first bushing member is seated in a respective one of the openings of the panel, and non-removably attaching the panel to the housing body such that the panel covers the opening of the housing body.

10. The method according to claim 9, further comprising mounting one or more capacitors inside the housing, mounting electrical connectors in the first bushing members and/or in the second bushing member, and mounting electrical conductors from the capacitor(s) to the electrical connectors before the panel is non-removably attached to the housing body.

11. The bushing assembly according to claim 2, wherein the one or more protrusions of the first bushing member comprises a circumferential flange, ridge, or shoulder.

12. The bushing assembly according to claim 3, wherein the one or more protrusions of the first bushing member comprises a circumferential flange, ridge, or shoulder.

13. The bushing assembly according to claim 2, wherein the first connection means and the second connection means are configured to engage each other on the second side of the panel.

14. The bushing assembly according to claim 3, wherein the first connection means and the second connection means are configured to engage each other on the second side of the panel.

15. The bushing assembly according to claim 4, wherein the first connection means and the second connection means are configured to engage each other on the second side of the panel.

16. The bushing assembly according to claim 5, wherein the first connection means and the second connection means are configured to engage each other on the second side of the panel.

* * * * *